(12) United States Patent
Cohen et al.

(10) Patent No.: US 10,275,408 B1
(45) Date of Patent: Apr. 30, 2019

(54) ANALYSIS AND VISUALIZATION TOOL UTILIZING MIXTURE OF MULTIPLE RELIABILITY MEASURES FOR PRODUCT AND PART COMBINATIONS

(71) Applicant: EMC Corporation, Hopkinton, MA (US)

(72) Inventors: Raphael Cohen, Beer-Sheva (IL); David M. Dionisio, Framingham, MA (US); Phu Son Le, Whitinsville, MA (US); Hengli Liang, Lexington, MA (US); Jenny L. Beazley, North Vancouver (CA)

(73) Assignee: EMC IP Holding Company LLC, Hopkinton, MA (US)

(*) Notice: Subject to any disclaimer, the term of this patent is extended or adjusted under 35 U.S.C. 154(b) by 465 days.

(21) Appl. No.: 14/670,976

(22) Filed: Mar. 27, 2015

(51) Int. Cl.
*G06F 16/25* (2019.01)
*G06F 17/30* (2006.01)
*G06F 16/248* (2019.01)

(52) U.S. Cl.
CPC .......... *G06F 16/254* (2019.01); *G06F 16/248* (2019.01); *G06F 17/30554* (2013.01); *G06F 17/30563* (2013.01)

(58) Field of Classification Search
CPC ............... G06F 17/30563; G06F 17/30554
See application file for complete search history.

(56) References Cited

U.S. PATENT DOCUMENTS

| 6,199,074 | B1 * | 3/2001 | Kern ................... G06F 11/2058 |
| 6,487,561 | B1 * | 11/2002 | Ofek .................. G06F 11/1451 |
| 7,606,844 | B2 * | 10/2009 | Kottomtharayil .......................... G06F 17/30082 |
| 7,860,824 | B2 * | 12/2010 | Suzuki .............. G06F 17/30368 707/609 |

(Continued)

OTHER PUBLICATIONS

U.S. Appl. No. 14/501,407 filed in the name of R. Cohen et al. filed Sep. 30, 2014 and entitled "Automated Content Inference System for Unstructured Text Data."

(Continued)

*Primary Examiner* — Ashish Thomas
*Assistant Examiner* — Abdullah A Daud
(74) *Attorney, Agent, or Firm* — Ryan, Mason & Lewis, LLP (57) ABSTRACT

An apparatus comprises a processing platform configured to implement an analysis and visualization tool utilizing a mixture of multiple reliability measures to characterize each of a plurality of product and part combinations. The analysis and visualization tool comprises a data aggregation module configured to extract product and part data from a big data repository, a reliability measure generator configured to process the extracted product and part data to generate a plurality of reliability measures for each of a plurality of different product and part combinations, a mixture model module configured to compute a score from the plurality of reliability measures for each of the different product and part combinations, and a visualization module configured to generate at least one visualization as a function of the scores (Continued)

computed for the respective different product and part combinations. The generated visualization may comprise a quadrant plot view visualization displaying the computed scores.

19 Claims, 6 Drawing Sheets

(56) References Cited

U.S. PATENT DOCUMENTS

| | | | | |
|---|---|---|---|---|
| 8,315,981 | B2* | 11/2012 | Prahlad | G06F 11/1458 707/640 |
| 8,745,003 | B1* | 6/2014 | Patterson | G06F 17/00 707/639 |
| 9,043,287 | B2* | 5/2015 | Periyagaram | G06F 3/0608 707/672 |
| 9,244,790 | B1* | 1/2016 | Ma | G06F 11/2221 |
| 9,298,715 | B2* | 3/2016 | Kumarasamy | G06F 17/30088 |
| 9,727,678 | B2* | 8/2017 | Wakefield | G06F 17/504 |
| 2003/0200055 | A1* | 10/2003 | Butler | G05B 23/0235 702/183 |
| 2004/0153184 | A1* | 8/2004 | Shima | G06F 17/50 700/97 |
| 2004/0174397 | A1* | 9/2004 | Cereghini | G06Q 30/02 715/855 |
| 2005/0149570 | A1* | 7/2005 | Sasaki | G06Q 10/06 |
| 2005/0192963 | A1* | 9/2005 | Tschiegg | G06Q 40/08 |
| 2006/0220660 | A1* | 10/2006 | Ninagawa | G06F 17/50 324/663 |
| 2007/0143371 | A1* | 6/2007 | Kottomtharayil | G06F 17/30082 |
| 2008/0016486 | A1* | 1/2008 | Chan | G06F 17/504 716/111 |
| 2008/0292134 | A1* | 11/2008 | Sharma | G06T 1/0064 382/100 |
| 2009/0024356 | A1* | 1/2009 | Platt | G05B 23/0281 702/181 |
| 2009/0083338 | A1* | 3/2009 | Evans | H04L 51/04 |
| 2011/0288783 | A1* | 11/2011 | Oka | G06F 19/18 702/19 |
| 2013/0073488 | A1* | 3/2013 | Anderson | G06Q 10/04 706/12 |
| 2013/0238562 | A1* | 9/2013 | Kumarasamy | G06F 17/30088 707/649 |
| 2013/0339298 | A1* | 12/2013 | Muller | G06F 17/30283 707/640 |
| 2014/0067303 | A1* | 3/2014 | Millman | G01R 31/016 702/84 |
| 2014/0108352 | A1* | 4/2014 | Ahrens | G06F 17/30174 707/645 |
| 2014/0236866 | A1* | 8/2014 | Montgomery | G06Q 40/04 705/36 R |
| 2014/0297699 | A1* | 10/2014 | Fujishima | G06F 3/0643 707/827 |
| 2014/0317063 | A1* | 10/2014 | Patterson | G06F 17/00 707/685 |
| 2015/0100355 | A1* | 4/2015 | Tanimoto | G06Q 50/26 705/7.11 |
| 2015/0278034 | A1* | 10/2015 | Barnes | G06F 17/30079 714/15 |
| 2016/0230514 | A1* | 8/2016 | Urdaneta | E21B 41/00 |
| 2016/0307447 | A1* | 10/2016 | Johnson | G05D 1/0044 |
| 2017/0177251 | A1* | 6/2017 | Chen | G06F 3/0619 |

OTHER PUBLICATIONS

U.S. Appl. No. 14/501,431 filed in the name of R. Cohen et al. filed Sep. 30, 2014 and entitled "Cluster Labeling System for Documents Comprising Unstructured Text Data."

U.S. Appl. No. 14/670,810 filed in the name of R. Cohen et al. filed Mar. 27, 29015 and entitled "Analysis and Visualization Tool with Combined Processing of Structured and Unstructured Service Event Data."

\* cited by examiner

ANALYSIS AND VISUALIZATION TOOL UTILIZING MIXTURE OF MULTIPLE RELIABILITY MEASURES FOR PRODUCT AND PART COMBINATIONS

FIELD

The field relates generally to information processing systems, and more particularly to analysis and visualization of data.

BACKGROUND

Enterprises that manufacture, sell or support products typically maintain information processing systems for storing reliability data regarding their products. For example, failure rates for various products may be stored and tracked over time in order to facilitate implementation of various product improvements and to coordinate other related functions such as customer support and product recalls.

Conventional approaches to product reliability analysis in such systems suffer from a number of significant drawbacks. For example, many of these approaches are unable to handle the high-dimensionality data that can result from large numbers of possible product and part combinations. Other approaches fail to provide sufficient specificity of predicted outcomes in the case of relatively sparse data and are therefore unsuitable for use in early detection of reliability issues.

SUMMARY

Illustrative embodiments of the present invention provide analysis and visualization tools that utilize a mixture of multiple reliability measures for product and part combinations. Such tools are advantageously configured in some embodiments to provide accurate and effective analysis of high-dimensionality data including many thousands of different product and part combinations. Moreover, these tools can effectively provide early detection of reliability issues even for sparse data.

In one embodiment, an apparatus comprises a processing platform configured to implement an analysis and visualization tool utilizing a mixture of multiple reliability measures to characterize each of a plurality of product and part combinations. The analysis and visualization tool comprises a data aggregation module configured to extract product and part data from a big data repository, a reliability measure generator configured to process the extracted product and part data to generate a plurality of reliability measures for each of a plurality of different product and part combinations, a mixture model module configured to compute a score from the plurality of reliability measures for each of the different product and part combinations, and a visualization module configured to generate at least one visualization as a function of the scores computed for the respective different product and part combinations.

The mixture model module in some embodiments is configured to weight respective ones of the plurality of reliability measures in computing the score for a given one of the product and part combinations.

The generated visualization may comprise, for example, a quadrant plot view visualization displaying the computed scores. Such a quadrant view visualization in some embodiments displays the scores computed for respective product and part combinations as a function of number of parts in field for a designated time period. Also, each of a plurality of points plotted in the quadrant plot view visualization may correspond to a different one of the product and part combinations. Additional or alternative visualizations can be generated, including a retrospective feature view visualization and a trend feature view visualization.

In one or more embodiments, the analysis and visualization tool is further configured to support drill down functionality into at least one of a particular product and a particular part of a given generated visualization.

The illustrative embodiments provide a number of significant advantages relative to the conventional arrangements described previously. For example, these embodiments avoid the above-noted problems with conventional approaches that cannot handle the high-dimensionality data resulting from large numbers of product and part combinations or cannot make accurate predictions of reliability issues from sparse data.

These and other illustrative embodiments described herein include, without limitation, apparatus, systems, methods and processor-readable storage media.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
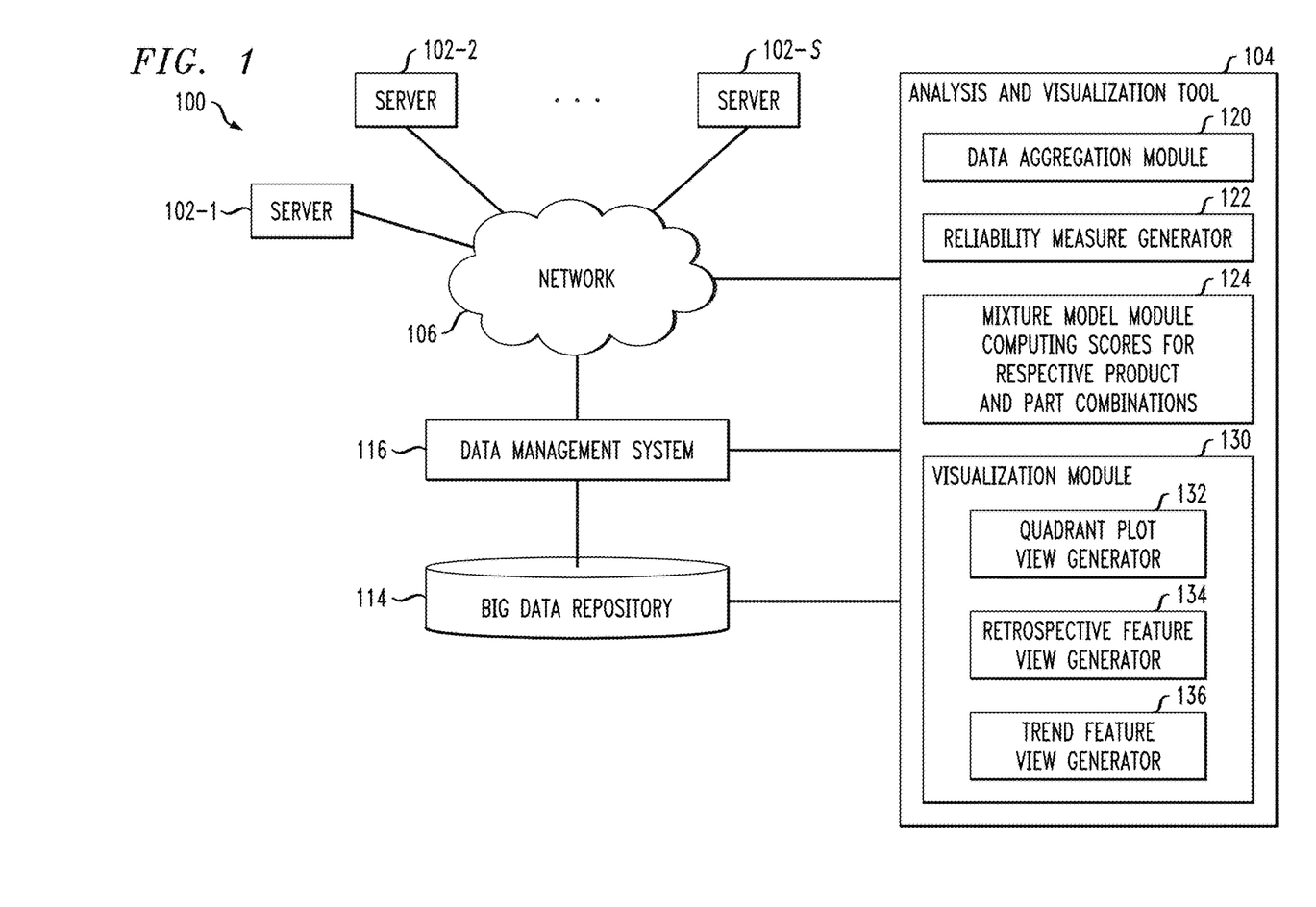
FIG. 1 is a block diagram of an information processing system that includes an analysis and visualization tool utilizing a mixture of multiple reliability measures to characterize each of a plurality of product and part combinations in an illustrative embodiment of the invention.

FIG. 1 shows an information processing system 100 configured in accordance with an illustrative embodiment of the present invention. The information processing system 100 is assumed to be built on at least one processing platform and provides an analysis and visualization tool that in the present embodiment utilizes a mixture of multiple reliability measures for product and part combinations.

The information processing system 100 in this embodiment illustratively comprises a plurality of servers 102-1, 102-2, . . . 102-S and an analysis and visualization tool 104, all of which are coupled to and communicate over a network 106. The analysis and visualization tool 104 is advantageously configured to generate scores for respective product and part combinations and to generate visualizations based on those scores.

The analysis and visualization tool 104 is coupled to a "big data" repository 114. The big data repository 114 in the present embodiment is assumed to store both product and part information. More particularly, data relating to a potentially large number of product and part combinations is stored in the repository 114. Such an arrangement may be viewed as an example of high-dimensionality data resulting from large numbers of possible product and part combinations. The high-dimensionality data can include, for example, data relating to hundreds or thousands of products each including up to tens of thousands of parts, all stored with relation to a significant number of distinct time periods, resulting in data tables with potentially billions of rows. Numerous other arrangements of billions of records can potentially result from collection of product and part data over time.

The terms "part" and "product" as used herein are intended to be broadly construed, and should not be viewed as being limited to any particular product or part types. For example, a product may comprise a storage product such as a storage array and a given part within that product may comprise a hard drive. Also, products and parts are not limited to hardware devices. For example, a part within a given product may comprise a particular software component within a larger software program.

It is to be appreciated that the big data repository 114 may comprise a combination of multiple separate databases, such as separate databases for different product lines. Such multiple databases may be co-located within a given data center or other facility or geographically distributed over multiple distinct facilities. Numerous other combinations of multiple databases each containing portions of product and part data can be used in implementing the big data repository 114.

By way of example, in an embodiment in which the system 100 is implemented by or on behalf of a customer-facing business such as a customer support organization, the data stored in the big data repository can comprise large amounts of information regarding part installation and failure. In the case of an organization providing hundreds of products with many different types of parts installed in these products, it is important to be able identify reliability issues in particular ones of these combinations as quickly as possible. For example, a specific data storage device may cause early failure in a specific hard drive type due to the data access algorithm utilized by the specific data storage device. However, the same hard drive type may have a normal life span in other products.

The big data repository 114 illustratively comprises one or more storage disks, storage arrays, electronic memories or other types of memory, in any combination. Although shown as separate from the analysis and visualization tool 104 in FIG. 1, the big data repository 114 in other embodiments can be at least partially incorporated within the analysis and visualization tool 104, or within one or more other system components.

The data stored in the big data repository 114 need not be in any particular format or formats, but generally comprises reliability data relating to particular parts in association with particular products. The big data repository 114 in this embodiment is controlled at least in part by an associated data management system 116. The analysis and visualization tool 104 can communicate directly with the big data repository 114 and the data management system 116, and additionally or alternatively can communicate with these system components via the network 106. The data management system 116 coordinates storage of data relating to product and part combinations in the big data repository 114, as well provisioning of portions of that data to the analysis and visualization tool 104 as needed for processing. It is also possible for the analysis and visualization tool 104 to provide data directly to, and retrieve data directly from, the big data repository 114.

At least portions of the data provided for storage in the big data repository 114 can come from one or more of the servers 102 via the data management system 116. Also, visualizations or other related analysis information such as alarms or reports can be delivered by the analysis and visualization tool 104 to one or more of the servers 102 over network 106 for delivery to other portions of the system 100, such as one or more user devices coupled to the network 106 but not explicitly shown in FIG. 1.

As mentioned previously, conventional approaches are unable to adequately handle the high-dimensionality data typically resulting from large numbers of product and part combinations. Moreover, such conventional approaches often have considerable difficulty in accurately identifying reliability issues in specific product and part combinations, particularly in the case of sparse data.

The analysis and visualization tool 104 in the present embodiment is advantageously configured to overcome the above-noted drawbacks of conventional approaches. For example, the analysis and visualization tool 104 in this embodiment is configured to provide a "dashboard" that utilizes a mixture model to permit early identification of reliability issues in particular product and part combinations in high-dimensionality data.

The analysis and visualization tool 104 more particularly comprises a data aggregation module 120, a reliability measure generator 122, a mixture model module 124 and a visualization module 130.

The data aggregation module 120 is configured to extract product and part data from the big data repository 114. For example, the product and part data extracted from the big data repository may be aggregated using predetermined data elements such as one or more of product name, part name, product instance identifier, time period, customer, number of parts in field, number of parts added, number of parts failed, total days to failure and total days in field. Numerous additional or alternative data elements in any combination may be used in performing data aggregation in the data aggregation module 120.

The reliability measure generator 122 is configured to process the extracted product and part data to generate a plurality of reliability measures for each of a plurality of different product and part combinations. Examples of reliability measures that may be used include failure rate, mean time to failure, change in failure rate and annual replacement rate.

The mixture model module 124 is configured to compute a score from the plurality of reliability measures for each of the different product and part combinations. For example, the mixture model module 124 is illustratively configured to weight respective ones of the plurality of reliability measures in computing the score for a given one of the product and part combinations. Particular instances of such scores in some embodiments are also referred to herein as "danger scores." The reliability measures used to generate a given score are referred to in some contexts as respective features. Certain features are more particularly characterized as retrospective features and others are characterized as trend features, as will be described in more detail elsewhere herein. Numerous other types of features or more generally reliability measures may be used by the mixture model module 124 in computing scores for respective product and part combinations in a given embodiment.

The visualization module 130 is configured to generate at least one visualization as a function of the scores computed for the respective different product and part combinations.

In the FIG. 1 embodiment, the visualization module 130 more particularly includes functionality for generating three distinct types of visualizations. The different visualizations are generated by respective view generator components of the visualization module, including a quadrant plot view generator 132, a retrospective feature view generator 134 and a trend feature view generator 136.

By way of example, a quadrant plot view visualization provided by view generator 132 can display the scores computed for respective product and part combinations as a function of number of parts in field for a designated time period. In such a quadrant plot view visualization, each of a plurality of the plotted points illustratively corresponds to a different one of the product and part combinations. A more detailed example of such a visualization will be described below in conjunction with FIG. 4.

Other types of visualizations include retrospective feature view visualizations provided by the view generator 134 and trend feature view visualizations provided by the view generator 136. A more detailed example of a visualization format generated by one of the view generators 134 or 136 will be described below in conjunction with FIG. 5.

In a given such retrospective feature view or trend feature view visualization, a given one of the scores may be presented using a corresponding display element in which a first display characteristic is used to indicate failure rate or failure rate trend and a second display characteristic is used to indicate the number of parts in the field.

For example, the display elements for the respective scores may each have a predetermined shape, such as a circular shape, with the first display characteristic comprising a color of the predetermined shape and the second display characteristic comprising a size of the predetermined shape.

These and other visualizations generated by the view generators of the visualization module 130 are configured to support drill down functionality into at least one of a particular product and a particular part of the generated visualization. Such functionality will be illustrated in the examples of FIGS. 4 and 5.

The analysis and visualization tool 104 is assumed to incorporate a user interface for selection of particular products or parts in conjunction with drill down functionality or other aspects of view generation.

By way of example, the analysis and visualization tool 104 can be configured to permit selection of one or more particular products from among a plurality of product and part combinations for which scores are presented in a given generated visualization. Responsive to selection of one or more particular products, the visualization is modified under the control of the corresponding view generator to show only those of the scores that relate to the selected product or products. Alternatively, the scores relating to the selected product or products may be highlighted in the visualization.

Although the data aggregation module 120 and reliability measure generator 122 in the FIG. 1 embodiment are shown as being implemented within the analysis and visualization tool 104, in other embodiments one or more of these modules can be implemented at least in part externally to the analysis and visualization tool. For example, the data aggregation module 120 can be implemented at least in part in a related system, such as the data management system 116 associated with the big data repository 114.

It should be noted that different arrangements of one or more view generators can be used in other embodiments. For example, in possible alternative embodiments, the visualization module 130 illustratively comprises only a subset of the quadrant plot view generator 132, the retrospective feature view generator 134 and the trend feature view generator 136. Also, a wide variety of additional or alternative view generators can be implemented in the visualization module 130 in other embodiments.

The visualization module 130 is configured to provide an output display showing at least a subset of the various visualizations generated by the view generators 132, 134 and 136, as well as any additional or alternative visualizations. The output display illustratively comprises one of a plurality of user interface displays that are generated under the control of the visualization module 130 and presented on a display screen of a user device not explicitly shown in the system 100 of FIG. 1. For example, such a user device may comprise a computer, mobile telephone or other type of processing device adapted for communication with the analysis and visualization tool 104 over the network 106.

The analysis and visualization tool 104 considerably facilitates identification of reliability issues in high-dimensionality data relating to large numbers of product and part combinations. For example, the generated visualizations allow analysts to quickly identify potentially problematic product and part combinations and to take appropriate remedial action.

It is to be appreciated that the particular arrangement of system components illustrated in FIG. 1 is exemplary only, and that numerous other arrangements of components may be used in other embodiments. For example, in other embodiments, functionality described herein as being associated with one or more of the data aggregation module 120, the reliability measure generator 122, the mixture model module 124 and the visualization module 130 may be implemented at least in part using additional or alternative components of the system 100.

Also, the analysis and visualization tool 104 can in some embodiments incorporate automated functionality for detecting reliability issues and alerting appropriate service or administrative personnel or other users. For example, a detector can be incorporated into the tool and configured to be responsive to particular detected data conditions associated with aberrations in a given visualization. The tool can then alert a user automatically via an appropriate alerting mechanism without the user having to view the visualization.

Accordingly, some embodiments can be configured to operate in an automatic reliability issue detection mode of operation in addition to or in place of the visualization-based analysis mode of operation described previously.

The analysis and visualization tool 104, and possibly other related components of system 100 such as the big data repository 114, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

The one or more processing devices implementing the analysis and visualization tool 104, and possibly other components of system 100, may each further include a network interface that allows such components to communicate with one another over one or more networks. For example, a given such network interface illustratively comprises network interface circuitry that allows at least one of the modules 120, 122, 124 and 130 to communicate over a network with other components of the system 100 such as servers 102, big data repository 114 and data management system 116. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the analysis and visualization tool 104, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 6 and 7.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. An example of another possible system embodiment will be described below in conjunction with FIG. 3.

The operation of the information processing system 100 will now be further described with reference to the flow diagram of FIG. 2, which illustrates an exemplary process carried out by the system 100 in one embodiment. The process as shown includes steps 200 through 208. Steps 200 through 208 are assumed to be performed by the analysis and visualization tool 104, but one or more of these steps may be performed at least in part by or in conjunction with other system components in other embodiments. Moreover, analysis and visualization functionality as disclosed herein should not be viewed as being limited in any way to this particular illustrative arrangement of process steps.

In step 200, product and part data are extracted from the big data repository 114. As noted above, such product and part data illustratively comprises high-dimensionality data relating to numerous distinct product and part combinations. For example, such data may comprise reliability data relating to respective product and part combinations for each of a plurality of products and each of a plurality of parts in each of the products. The big data repository 114 can store such product and part data for hundreds or thousands of products each containing tens of thousands of parts, over a significant number of time periods, potentially resulting in billions of table columns or other records.

The extraction of the product and part data in step 200 illustratively involves aggregating the data in aggregation module 120 using predetermined data elements such as, for example, product name, part name, product instance identifier, time period, customer, number of parts in field, number of parts added, number of parts failed, total days to failure and total days in field. For example, in generating the visualization to be described in conjunction with FIG. 4, data relating to total numbers of particular different types of disk drives deployed in the field for a given time period is aggregated for each of a plurality of different products that include one or more of those disk drives.

In step 202, the extracted product and part data are processed to generate a plurality of reliability measures for each of a plurality of different product and part combinations. Thus, for each of the different product and part combinations, multiple distinct reliability measures are determined. As indicated previously, examples of such reliability measures include failure rate, mean time to failure, change in failure rate and annual replacement rate. The mean time to failure measure is also referred to herein as mean age at failure, where "age" in this context refers to the amount of time the part has been deployed in the field. In addition, the change in failure rate is also referred to herein as failure rate trend.

In step 204, a score is computed from the plurality of reliability measures for each of the different product and part combinations. The score is illustratively computed using the mixture model module 124. By way of example, the mixture model module 124 is configured to weight respective ones of the plurality of reliability measures in computing the score for a given one of the product and part combinations. The resulting score in some embodiments is referred to as a "danger score" as a higher score indicates a higher likelihood or danger of a reliability issue for the corresponding combination.

As a more particular example, the score for a given product and part combination may be computed as a weighted sum of the following three reliability measures, also referred to as normalized features:

1. failure Rate (FR): 365*#failures/#days_in_field
2. Mean age at failure: #total_days_in_field_of_failed_drives/#failures
3. Failure Rate Trend:

$$\sum \frac{FR(\text{year})}{FR(6_{month})} * 0.7 + \frac{FR(\text{year})}{FR(9 \text{ month})} * 0.3$$

Utilizing these three exemplary reliability measures corresponding to respective normalized features, the danger score is computed as a weighted sum as follows:

$$\Sigma \text{normalized\_feature} * \text{weight}(\text{feature})$$

These features can be weighted equally or according to a particular business intuition. For example, if it is desirable to make the danger scores more sensitive to a rise in the failure rate, the weight of that feature can be increased. The particular time period used for the danger score computations can be subject to user selection from a finite number of time periods, such as a week, a month or a year.

The danger score in the example above when presented in one or more of the visualization views disclosed herein provides an analyst with the ability to much more easily detect and prioritize outliers among the vast amounts of data relating to product and part combinations in a given system.

It is to be appreciated that the foregoing danger score is just one example of a particular type of score that can be computed by a mixture model module 124 of the analysis and visualization tool 104 in an illustrative embodiment. Numerous other sets of reliability measures and score computation techniques can be used in other embodiments. For example, the coefficients and time periods utilized in the equation for determining failure rate trend can be varied in other embodiments.

In step 206, at least one visualization is generated as a function of the scores computed for the respective different product and part combinations. For example, in some embodiments a quadrant plot view visualization is generated using the generator 132 of the visualization module 130. Such a quadrant plot view visualization may be configured to display the scores computed for respective product and part combinations as a function of number of parts in field for a designated time period. Different colors or other display characteristics can be used to indicate that the score for a particular product and part combination falls within a given quadrant or other portion of such a plot.

As mentioned previously, examples of visualizations that may be generated in step 206 of the FIG. 2 process will be described below in conjunction with FIGS. 4 and 5. However, it is to be appreciated that numerous other types of visualizations may be generated in a given embodiment of an analysis and visualization tool.

In step 208, the visualization is manipulated via an associated user interface of the analysis and visualization tool 104 to identify and explore potentially problematic product and part combinations. For example, the user interface may be configured to permit selection of one or more particular products from among a plurality of product and part combinations for which scores are presented in the generated visualization. Responsive to selection of one or more particular products, the visualization is modified to show only those of the scores that relate to the selected product or products.

Additionally or alternatively, automated functionality for detecting reliability issues and alerting appropriate service or administrative personnel or other users can be provided. For example, as noted above, a detector can be incorporated into the tool and configured to be responsive to particular detected data conditions associated with aberrations in a given visualization. The tool can then alert a user automatically via an appropriate alerting mechanism without the user having to view the visualization.

Steps 200 through 208 can be repeated periodically or as needed to process additional data relating to product and part combinations from the big data repository 114.

Figure 2:
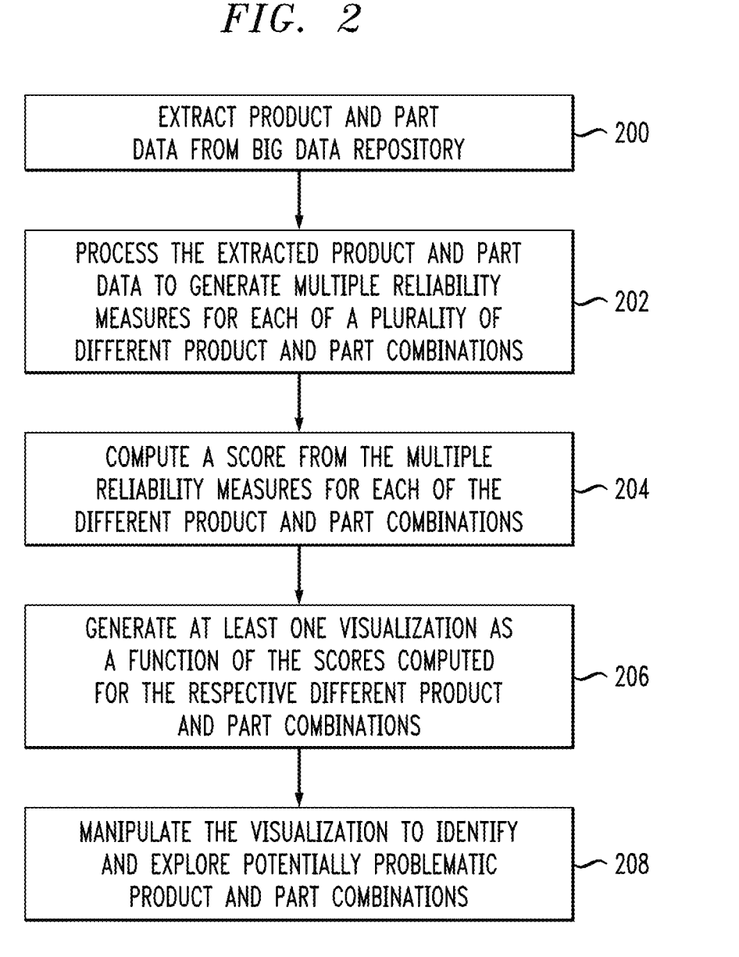
FIG. 2 is a flow diagram of an exemplary process implemented in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing an analysis and visualization tool or portions thereof. For example, the ordering of the process steps may be varied in other embodiments, or certain steps may be performed concurrently with one another rather than serially.

It is to be appreciated that analysis and visualization functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing an analysis and visualization tool as disclosed herein.

Figure 3:
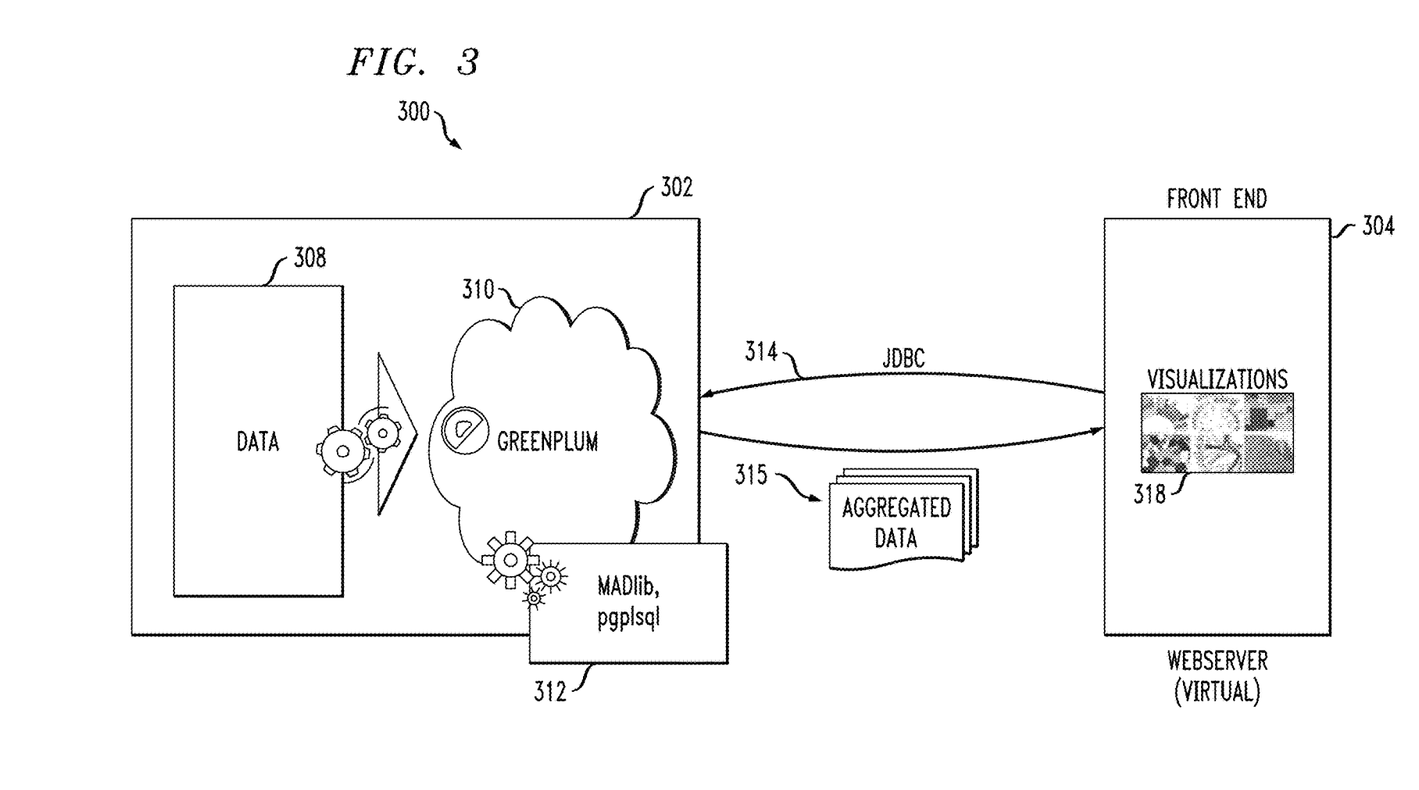
FIG. 3 shows another illustrative embodiment of an information processing system configured to include an analysis and visualization tool.

FIG. 3 shows another example of an information processing system 300 that implements an analysis and visualization tool in an illustrative embodiment. The system 300 comprises a data layer portion 302 and a front end portion 304. The data layer portion 302 comprises data 308 that is processed by an analytics system 310 illustratively implemented as a Greenplum® system. Additional functional elements 312 illustratively include a plurality of elements for implementing respective MADlib and pgplsql functionality. These elements interact with the analytics system 310 with input 314 from the front end portion 304. More particularly, front end portion 304 interacts with the analytics system 310 via Java DataBase Connectivity (JDBC) and receives sets of aggregated data 315 therefrom as illustrated.

The front end portion 304 comprises a web server illustratively implemented using one or more virtual machines and includes a user interface 318 providing visualizations of the type described elsewhere herein. The web server of the front end portion 304 communicates with the data layer portion 302 via JDBC as previously indicated.

The various portions of system 300 are adapted in the present embodiment to implement the functionality of the analysis and visualization tool 104 as previously described. This particular system configuration is only an example, and numerous other arrangements of system components can be used to provide that functionality.

As indicated previously, examples of visualizations and associated user interface displays generated by an analysis and visualization tool in illustrative embodiments will now be described with reference to FIGS. 4 and 5.

Figure 4:
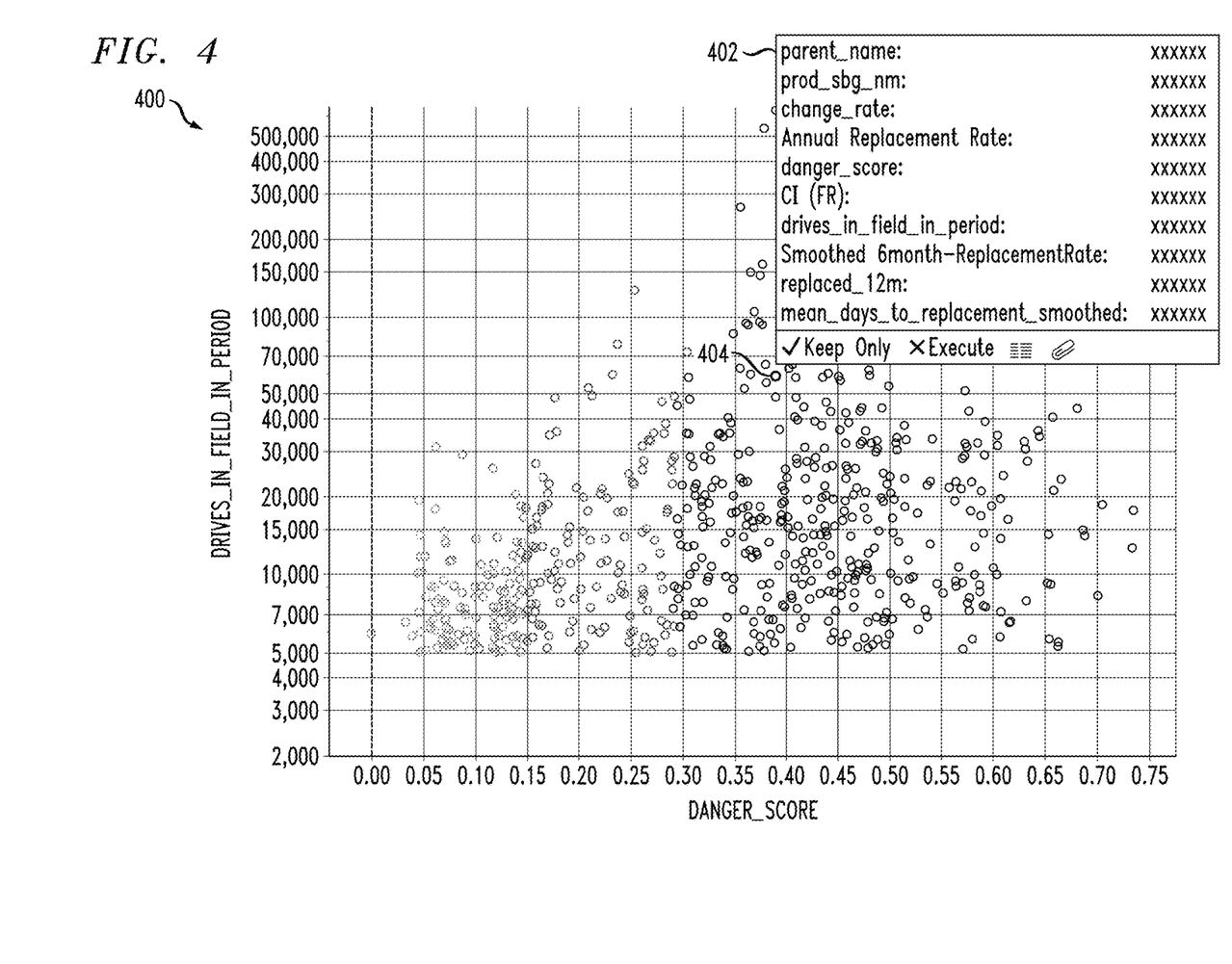
FIGS. 4 and 5 show examples of user interface displays generated by an analysis and visualization tool in illustrative embodiments.

Referring initially to FIG. 4, an exemplary user interface display 400 generated by the analysis and visualization tool 104 is shown. The user interface display 400 is assumed to be one of a plurality of different user interface displays that are generated by the analysis and visualization tool 104. As shown in the figure, the user interface display 400 includes a quadrant plot of disk drives in the field for a particular time period as a function of the danger score. The time period is assumed to be a year and the danger score is assumed to be computed as a weighted sum of the three exemplary reliability measures of failure rate, mean age at failure and failure rate trend, as previously described. The quadrant plot in this example therefore displays the danger scores computed for respective product and part combinations as a function of the number of disk drives in the field for the designated time period. Each small open circle is a plotted point corresponding to a different product and part combination. Variation in coloring or shading of the plotted points is introduced with increasing danger score, such that points falling within common quadrants exhibit a common coloring or shading.

It should be noted in this regard that the term "quadrant plot" as used herein is intended to be generally construed, and does not require that a plot be separated into any particular number of areas. Accordingly, a plot such as that shown in FIG. 4 in which different coloring or shading is associated with points falling into different areas within the plot is assumed to be a type of quadrant plot as that term is broadly used herein.

The user interface display 400 is configured to support drill down functionality into each of the plotted points corresponding to respective product and part combinations. For example, a pop-up data window 402 is presented upon selection of a particular plotted point 404. This data window 402 presents the danger score and number of drives in field for the selected point, as well as additional information associated with that point, such as one or more of parent name, product name, change rate, annual replacement rate, smoothed six month replacement rate, twelve month replacement rate, and mean days to replacement smoothed. The "parent name" in this example refers to a particular corporate entity name for the particular product at issue, and CI(FR) denotes the confidence interval for the failure rate or replacement rate. The data window 402 also provides functionality for allowing a user to exclude all points corresponding to the same product that is the subject of the selected point, or to keep only the points that correspond to the same product that is the subject of the selected point.

Figure 5:
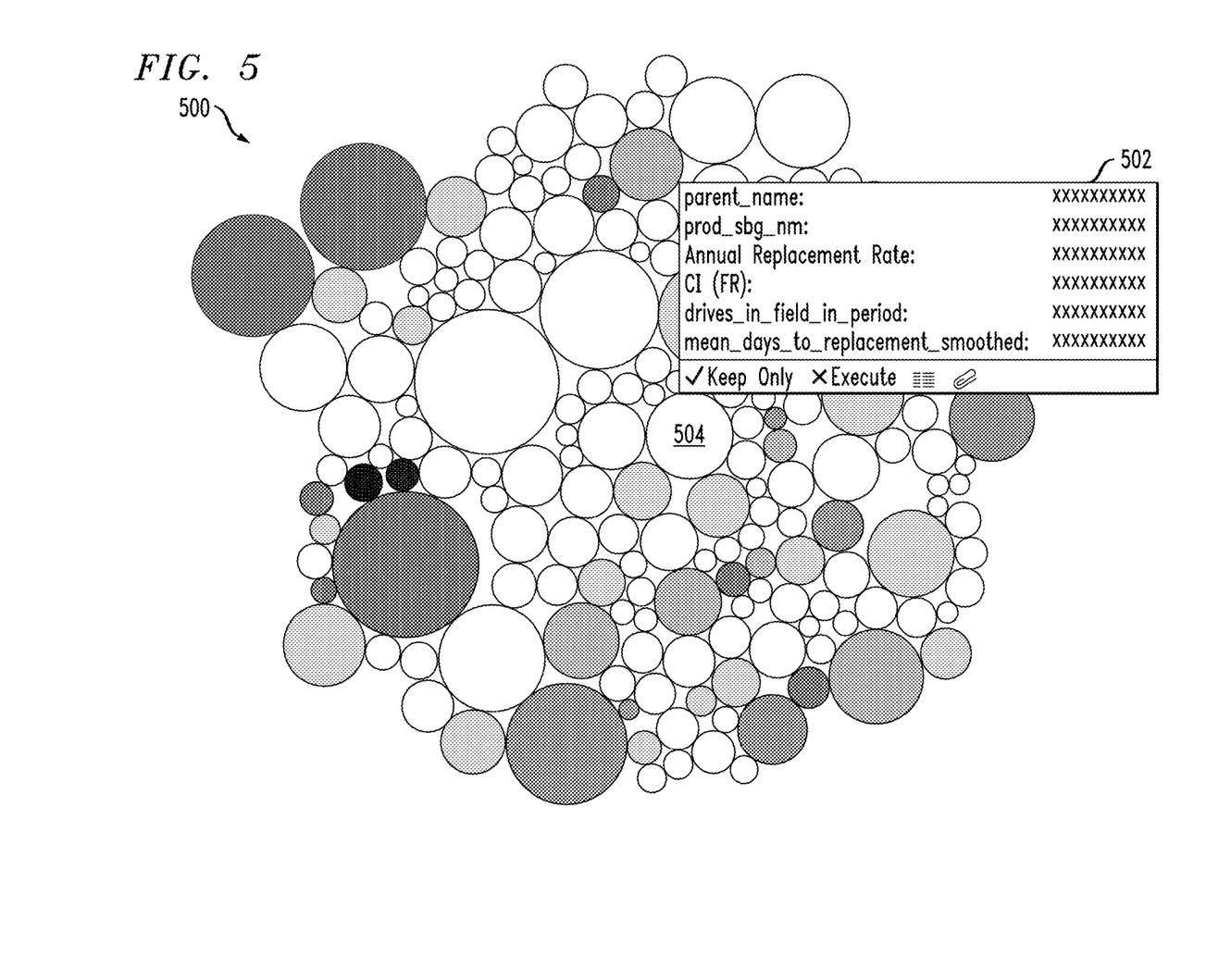

FIG. 5 shows another exemplary user interface display 500 generated by the analysis and visualization tool 104. In this example, the user interface display 500 comprises a plurality of circular display elements corresponding to respective danger scores. The danger scores are computed for respective product and part combinations in the manner previously described. The circular display elements have sizes that are proportional to the number of drives in the field for the designated period. Different shadings or colors can be used to identify the particular display elements associated with certain ranges of danger scores.

As in the FIG. 4 embodiment, a pop-up data window 502 is presented upon selection of a particular plotted point 504. This data window 502 presents the danger score and number of drives in field for the selected point, as well as additional information associated with that point.

Additionally or alternatively, different shadings or colors can be used to identify those scores that are associated with particular desired retrospective or trend values for certain reliability measures based on user selection. For example, shadings or colors can be used to highlight those display elements having particular retrospective reliability measure values such as failure rate or mean age at failure, or particular trend reliability measure values such as failure rate trend. Displays highlighting retrospective or trend reliability measures using shading or color are examples of what are also referred to herein as retrospective feature view and trend feature view visualizations, respectively.

The exemplary user interface displays of FIGS. 4 and 5 provide an ability to quickly drill down into the details of specific product and part combinations of interest even though the features on which the displays are based are aggregated from a big data repository potentially containing billions of distinct records. Such arrangements can also be used to generate customer reports focused on a specific customer base by product name. Additional dimensions can be added to the visualizations and utilized for filtering purposes.

It should be understood that the particular user interface displays illustrated in FIGS. 4 and 5 are presented by way of example only, and should not be construed as limiting the scope or functionality of the analysis and visualization tool 104 in any way.

As mentioned previously, the system embodiments of FIGS. 1 and 3 are presented by way of example only. Numerous other configurations and arrangements of components can be used to implement an analysis and visualization tool.

The illustrative embodiments provide a number of significant advantages relative to conventional arrangements. For example, these embodiments provide particularly efficient processing of data relating to product and part combinations. User interface displays such as those illustrated in FIGS. 4 and 5 provide detailed insights into reliability issues associated with product and part combinations. Such insights would not otherwise be apparent using conventional approaches.

Analysis and visualization tools in some embodiments are advantageously configured to provide accurate and effective analysis of high-dimensionality data including many thousands of different product and part combinations. Moreover, these tools can effectively provide early detection of reliability issues even for sparse data.

A given analysis and visualization tool configured as disclosed herein can provide a strong early detection capability not otherwise available for reliability issues arising in particular product and part combinations. For example, such a tool can be configured to identify a particular product and part combination as being problematic even if the corresponding failure rate is below an average failure rate.

The analysis and visualization tools as disclosed herein in some embodiments are configured to provide an efficient and simple to use dashboard for business intelligence. Such an arrangement can maximize the impact of analysis resources and minimize reliability issue costs to the organization.

The mixture model approach utilized in some embodiments is amenable to injecting domain knowledge or requirements as weights on the different features.

It is to be appreciated that the foregoing advantages are illustrative of advantages provided in certain embodiments, and need not be present in other embodiments.

It was noted above that portions of the information processing system 100 may be implemented using one or more processing platforms. A given such processing platform comprises at least one processing device comprising a processor coupled to a memory, and the processing device may be implemented at least in part utilizing one or more virtual machines, containers or other virtualization infrastructure.

Illustrative embodiments of such platforms will now be described in greater detail. Although described in the context of system 100, these processing platforms may also be used to implement at least portions of other information processing systems in other embodiments of the invention, such as the information processing system 300 of FIG. 3.

Figure 6:
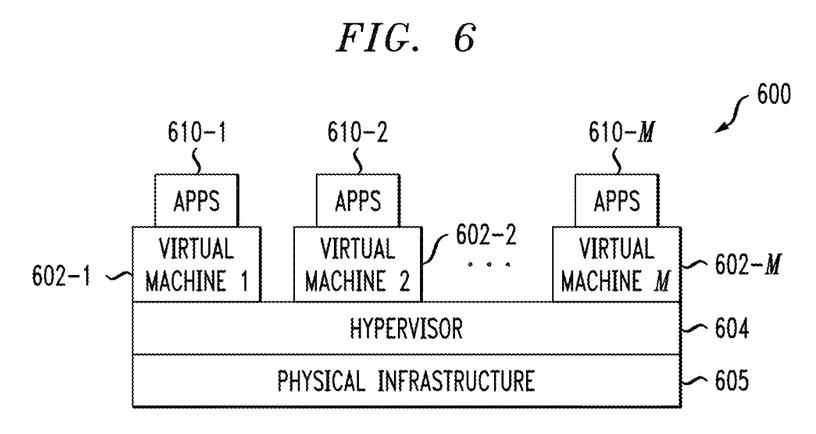
FIGS. 6 and 7 show examples of processing platforms that may be utilized to implement at least a portion of one or more of the information processing systems of FIGS. 1 and 3.

As shown in FIG. 6, portions of the information processing system 100 may comprise cloud infrastructure 600. The cloud infrastructure 600 comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

Although only a single hypervisor 604 is shown in the embodiment of FIG. 6, the system 100 may of course include multiple hypervisors each providing a set of virtual machines using at least one underlying physical machine. For example, different sets of virtual machines provided by respective ones of multiple hypervisors may be utilized in configuring multiple instances of one or more of data aggregation module 120, reliability measure generator 122, mixture model module 124, visualization module 130 or other components of the system 100.

An example of a commercially available hypervisor platform that may be used to implement hypervisor 604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

The cloud infrastructure 600 in FIG. 6 can additionally or alternatively be implemented using other types of virtualization techniques, such as Docker containers or other types of containers.

Figure 7:
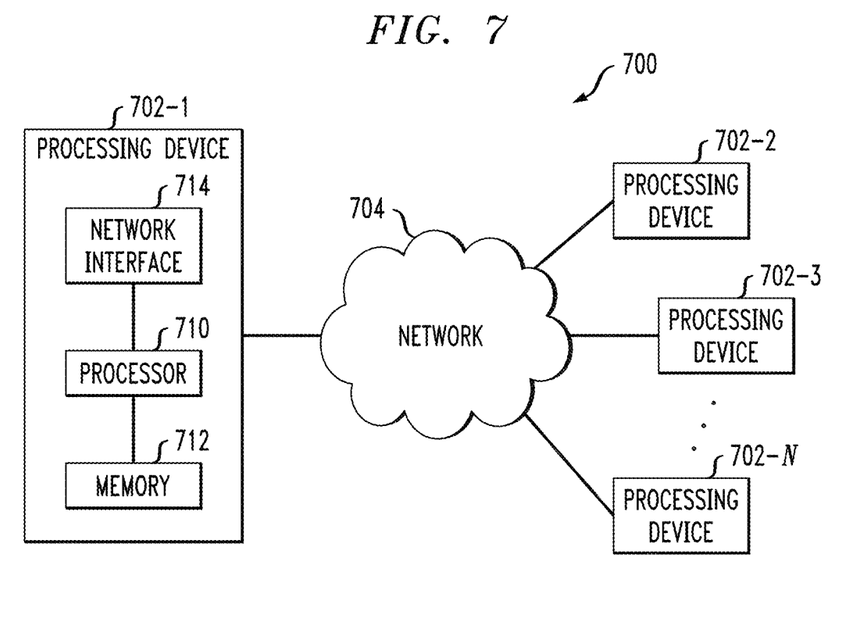

Another example of a processing platform suitable for use in some embodiments is processing platform 700 shown in FIG. 7. The processing platform 700 in this embodiment is assumed to comprise at least a portion of system 100 and includes a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an ASIC, an FPGA, or other type of processing circuitry, as well as portions or combinations of such circuitry elements.

The memory 712 may comprise RAM, ROM or other types of memory, in any combination. As mentioned previously, the memory 712 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform comprising one or more processing devices each comprising a processor coupled to a memory;
wherein the processing platform is configured:
to extract product and part data from a big data repository;
to process the extracted product and part data to generate a plurality of reliability measures for each of a plurality of different product and part combinations;
to compute a score from the plurality of reliability measures for each of the different product and part combinations;
to generate at least one visualization as a function of the scores computed for the respective different product and part combinations; and
responsive to detecting one or more data conditions associated with an aberration in the generated visualization, to provide an alert indicating the aberration to a user;
wherein the plurality of reliability measures for each of the plurality of different product and part combinations comprises:
at least one retrospective reliability measure characterizing at least one of a failure rate and a mean age at failure; and
at least one trend reliability measure characterizing a failure rate trend;
wherein the generated visualization comprises two or more distinct display elements each associated with a corresponding set of one or more product and part combinations for a designated time period;

wherein a given one of the display elements comprises a first display characteristic indicating the one or more scores computed for its associated set of one or more product and part combinations and a second display characteristic indicating a number of instances of the product and part combinations in its associated set of one or more product and part combinations that are in field during the designated time period;

wherein the first display characteristic comprises at least one of a shading and a color of the given display element;

wherein the second display characteristic comprises a size of the given display element relative to one or more other display elements;

wherein the processing platform is further configured to adjust the generated visualization such that the first display characteristic of the given display element represents one of the at least one retrospective reliability measure and the at least one trend reliability measure for its associated set of one or more product and part combinations; and wherein adjusting the generated visualization comprises dynamically adjusting the generated visualization in response to user input to change the first display characteristic from (i) representing the one or more scores computed as a combination of the at least one retrospective reliability measure and the at least one trend measure to (ii) representing scores computed using one of the at least one retrospective reliability measure and the at least one trend measure.

2. The apparatus of claim 1 wherein the processing platform is configured to weight respective ones of the plurality of reliability measures in computing the score for a given one of the product and part combinations.

3. The apparatus of claim 1 wherein the product and part data extracted from the big data repository is aggregated using predetermined data elements including at least a subset of product name, part name, product instance identifier, time period, customer, number of parts in field, number of parts added, number of parts failed, total days to failure and total days in field.

4. The apparatus of claim 1 wherein the plurality of reliability measures comprise two or more of failure rate, mean time to failure, change in failure rate and annual replacement rate.

5. The apparatus of claim 1 wherein the generated visualization comprises a quadrant plot view visualization.

6. The apparatus of claim 5 wherein the quadrant plot view visualization displays the scores computed for respective product and part combinations as a function of number of parts in field for a designated time period.

7. The apparatus of claim 5 wherein each of a plurality of points plotted in the quadrant plot view visualization corresponds to a different one of the product and part combinations.

8. The apparatus of claim 1 wherein the generated visualization is configured to support drill down functionality into at least one of a particular product and a particular part of the generated visualization.

9. The apparatus of claim 1 wherein the generated visualization is configured to permit selection of one or more particular products from among a plurality of product and part combinations for which scores are presented in the generated visualization and wherein responsive to selection of one or more particular products the generated visualization is modified to show only those of the scores that relate to the selected product or products.

10. The apparatus of claim 1 wherein the first display characteristic is used to indicate one of failure rate and failure rate trend.

11. An information processing system comprising the apparatus of claim 1.

12. A method comprising:
extracting product and part data from a big data repository;

processing the extracted product and part data to generate a plurality of reliability measures for each of a plurality of different product and part combinations;

computing a score from the plurality of reliability measures for each of the different product and part combinations;

generating at least one visualization as a function of the scores computed for the respective different product and part combinations;

responsive to detecting one or more data conditions associated with an aberration in the generated visualization, providing an alert indicating the aberration to a user;

wherein the plurality of reliability measures for each of the plurality of different product and part combinations comprises:

at least one retrospective reliability measure characterizing at least one of a failure rate and a mean age at failure; and at least one trend reliability measure characterizing a failure rate trend;

wherein the generated visualization comprises two or more distinct display elements each associated with a corresponding set of one or more product and part combinations for a designated time period;

wherein a given one of the display elements comprises a first display characteristic indicating the one or more scores computed for its associated set of one or more product and part combinations and a second display characteristic indicating a number of instances of the product and part combinations in its associated set of one or more product and part combinations that are in field during the designated time period;

wherein the first display characteristic comprises at least one of a shading and a color of the given display element;

wherein the second display characteristic comprises a size of the given display element relative to one or more other display elements;

adjusting the generated visualization such that the first display characteristic of the given display element represents one of the at least one retrospective reliability measure and the at least one trend reliability measure for its associated set of one or more product and part combinations;

wherein adjusting the generated visualization comprises dynamically adjusting the generated visualization in response to user input to change the first display characteristic from (i) representing the one or more scores computed as a combination of the at least one retrospective reliability measure and the at least one trend measure to (ii) representing scores computed using one of the at least one retrospective reliability measure and the at least one trend measure; and wherein the method is performed by a processing platform comprising one or more processing devices.

13. The method of claim 12 wherein generating at least one visualization comprises generating a quadrant plot view visualization and wherein the quadrant plot view visualization displays the scores computed for respective product and part combinations as a function of number of parts in field for the designated time period.

14. The method of claim 12 further comprising:
permitting selection of one or more particular products from among a plurality of product and part combinations for which scores are presented in the generated visualization; and
responsive to selection of one or more particular products, modifying the visualization to show only those of the scores that relate to the selected product or products.

15. A non-transitory processor-readable storage medium having program code of one or more software programs embodied therein, wherein the program code when executed by at least one processing device of a processing platform causes the processing device:
to extract product and part data from a big data repository;
to process the extracted product and part data to generate a plurality of reliability measures for each of a plurality of different product and part combinations;
to compute a score from the plurality of reliability measures for each of the different product and part combinations;
to generate at least one visualization as a function of the scores computed for the respective different product and part combinations; and
responsive to detecting one or more data conditions associated with an aberration in the generated visualization, to provide an alert indicating the aberration to a user;
wherein the plurality of reliability measures for each of the plurality of different product and part combinations comprises:
at least one retrospective reliability measure characterizing at least one of a failure rate and a mean age at failure; and
at least one trend reliability measure characterizing a failure rate trend;
wherein the generated visualization comprises two or more distinct display elements each associated with a corresponding set of one or more product and part combinations for a designated time period; and
wherein a given one of the display elements comprises a first display characteristic indicating the one or more scores computed for its associated set of one or more product and part combinations and a second display characteristic indicating a number of instances of the product and part combinations in its associated set of one or more product and part combinations that are in field during the designated time period;
wherein the first display characteristic comprises at least one of a shading and a color of the given display element;
wherein the second display characteristic comprises a size of the given display element relative to one or more other display elements;
adjusting the generated visualization such that the first display characteristic of the given display element represents one of the at least one retrospective reliability measure and the at least one trend reliability measure for its associated set of one or more product and part combinations; and
wherein adjusting the generated visualization comprises dynamically adjusting the generated visualization in response to user input to change the first display characteristic from (i) representing the one or more scores computed as a combination of the at least one retrospective reliability measure and the at least one trend measure to (ii) representing scores computed using one of the at least one retrospective reliability measure and the at least one trend measure.

16. The processor-readable storage medium of claim 15 wherein the storage medium comprises at least one of an electronic memory and a storage disk.

17. The processor-readable storage medium of claim 15 wherein the program code when executed by at least one processing device further causes said processing device:
to generate said at least one visualization as a quadrant plot view visualization configured to display the scores computed for respective product and part combinations as a function of number of parts in field for the designated time period.

18. The apparatus of claim 1 wherein adjusting the generated visualization comprises utilizing one or more designated shadings or colors to highlight a selected one of the at least one retrospective reliability measure and the at least one trend reliability measure.

19. The apparatus of claim 1 wherein adjusting the generated visualization comprises utilizing one or more designated shadings or colors to highlight respective ones of the display elements whose associated set of one or more product and part combinations have particular desired values of a selected one of the at least one retrospective reliability measure and the at least one trend reliability measure.

* * * * *